April 30, 1968 W. E. EGAN 3,381,146

TRIGGER PULSE CIRCUIT

Filed Aug. 4, 1967

INVENTOR
WILLIAM E. EGAN

BY Claude Funkhouser
ATTORNEY

United States Patent Office 3,381,146

Patented Apr. 30, 1968

3,381,146

TRIGGER PULSE CIRCUIT

William E. Egan, Pittsfield, Mass, assignor, by mesne assignments, to the United States of America as represented by the Secretary of the Navy

Continuation-in-part of application Ser. No. 399,412, Sept. 25, 1964. This application Aug. 4, 1967, Ser. No. 662,259

1 Claim. (Cl. 307—305)

ABSTRACT OF THE DISCLOSURE

The patent specification and drawings describe a system for controlling the current to an inductive load by utilizing a silicon controlled rectifier capacitor discharge circuit operating from an A.C. source and having a trigger pulse source and a transient suppressor diode.

*Cross reference to related application*

This application is a continuation-in-part of application Ser. No. 399,412, filed Sept. 25, 1964, and now abandoned, for a Trigger Pulse Circuit.

*Background of the invention*

The present invention relates to trigger pulse circuits and, more particularly, to trigger pulse circuits requiring heavy current pulses to drive an inductive load.

Designers of triggering circuits which are required to generate heavy currents due to the load that they are driving, have generally utilized power transistors or silicon controlled rectifiers operating from direct current power sources. These circuits are characteristically complex and, hence, relatively unreliable.

*Summary of the invention*

The trigger pulse circuit of the present invention utilizes a silicon controlled rectifier in an alternating current power drive circuit. This type of drive eliminates the turn-off problems inherent with the silicon controlled rectifier and further requires a minimum amount of circuitry. Therefore, the device of the present invention results in fail-safe operation and reliability far in excess of prior art devices.

An object of the present invention is the provision of a trigger pulse circuit for an inductive load.

A further object of the present invention is the provision of a trigger pulse circuit for driving loads requiring heavy current pulses thereto.

A further object of the present invention is the provision of a trigger pulse circuit which provides for driving heavy current loads and which is fail-safe, reliable, and provides transient suppression.

Other objects, advantages and novel features of the invention will become apparent from the following detailed description of the invention when considered in conjunction with the accompanying drawings wherein:

*Description of the preferred embodiment*

Figure 1:
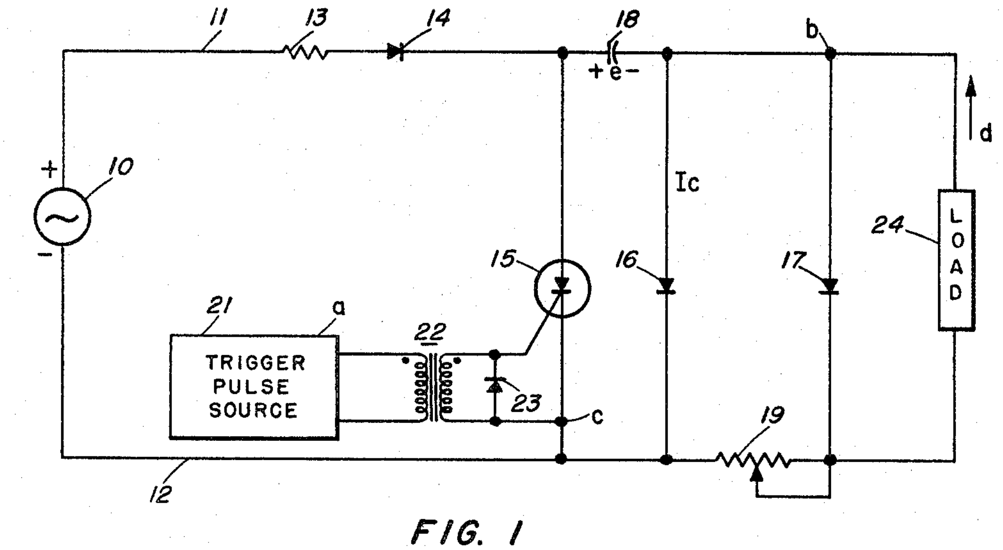
FIG. 1 illustrates a schematic drawing of an embodiment of the invention.

Referring now to the drawings there is shown in FIG. 1, which illustrates an embodiment of the invention, a source of alternating current 10. The terminals of the source 10 are connected to a first bus 11 and a second bus 12. In series with bus 11 is a resistor 13 and a diode

14, the anode of which is connected to one end of the resistor 13. In parallel across busses 11 and 12 is a silicon controlled rectifier 15, the anode of which is connected to bus 11 and the cathode of which is connected to bus 12; and crystal rectifier diodes 16 and 17, the anodes of which are connected to bus 11 and the cathodes of which are connected to bus 12. In series with bus 11 and between the anodes of diodes 15 and 16 is a capacitor 18 and in series with bus 12 between the cathodes of diodes 16 and 17 is a potentiometer or adjustable resistor 19, the wiper arm of which is connected to the junction formed by the cathode of diode 17 and one end of the resistor 19.

A trigger pulse source 21 is connected to the primary of a magnetic core transformer 22, the polarity of which is shown as marked by the polarity dots. The secondary of the magnetic core transformer 22 has a diode 23 connected thereacross, the cathode of which is connected to the terminal of the secondary winding bearing the polarity marking and the anode connected to the other terminal of the secondary. The common junction formed by the cathode of diode 23 and the first mentioned terminal of the secondary of magnetic core transformer 22 is connected to the trigger lead of the silicon controlled rectifier 15. The other end of the secondary is connected to the bus 12. An inductive load 24 on the output terminals of the device is connected in parallel across the busses 11 and 12.

Figure 2:
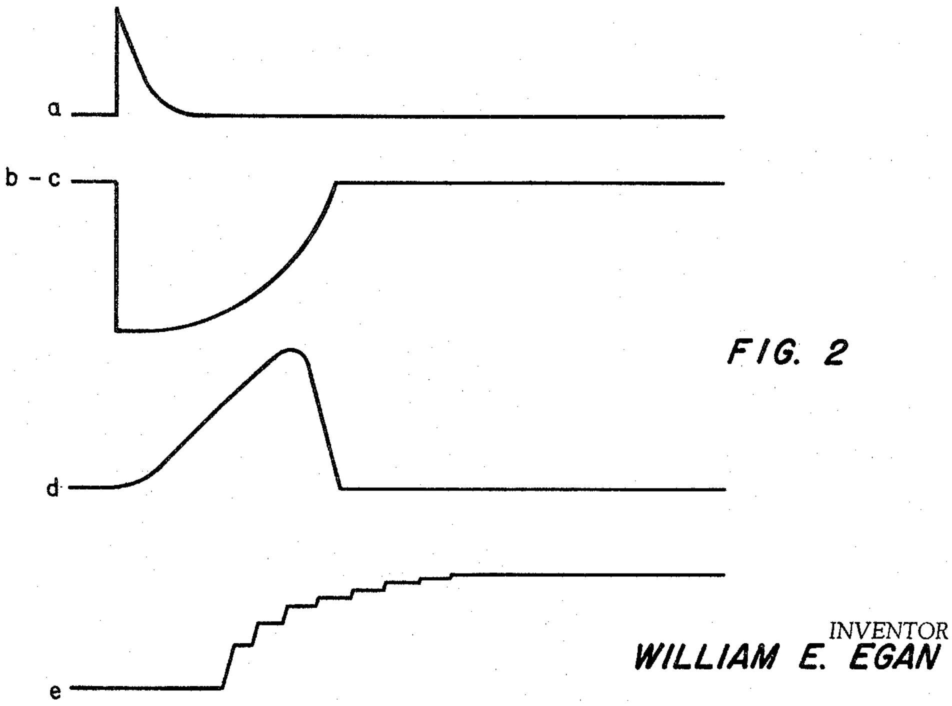
FIG. 2 illustrates typical waveforms at various points throughout the schematic of FIG.1 for inductive loads.

The trigger pulse circuit normally operates with a magnetic solenoid or transformer load. Therefore, the waveforms of FIG. 2 are shown for an inductive type load. Referring now to FIG. 2 in conjunction with FIG. 1, for a discussion of the operation of the invention, the trigger pulse circuit is essentially a pulse forming type of network utilizing an A.C. line voltage to charge the capacitor 18 to its peak voltage, as shown by waveform *e*. The capacitor is then discharged through the load 24 and resistor 19. For an inductive load, the voltage is as shown in waveform *b–c* and current through the load by wave form *d* when an appropriate trigger pulse is supplied by the trigger pulse source 21. The trigger pulse current waveform is shown by waveform *a*. Upon reversal of the line voltage the negative going portion of the sinusoidal cycle turns off the silicon controlled rectifier circuit after the conclusion of the trigger pulse. The voltage charging waveform *e* of capacitor 18 is substantially longer than the scale for the other waveforms. Each step indicates a cycle of the source 10.

The half-wave rectifier circuit consists of resistor 13, rectifier diode 14, capacitor 18, and rectifier diode 16. Rectifiers 14 and 17 serve as safety devices. If the load becomes shorted, the diode 14 allows only half-wave rectification. Rectifier diode 17 is used as transient suppressor for inductive loads. Rectifier diode 16 shunts the load 24 and resistor 19 during capacitor charging to prevent the load impedance from effecting the charge time constant. Rectifier diode 16 also prevents opposite polarity signals from appearing across the load 24 and series resistor 19. The potentiometer 10 is inserted in the discharge path of the capacitor to allow adjustment of the damping factor ($R/2L$) for inductive loads or the discharge time constant (RC) for resistive loads.

The capacitor 18 is charged by the source of A.C. current through resistor 13 and diodes 14 and 16 allowing only half-wave rectification. As stated hereinbefore, the potentiometer 19 may be adjusted to vary the resistive parameter of the load. The rise time and peak current to the load are functions of the total equivalent impedance of the circuit and the voltage of the source. As mentioned hereinbefore, the waveform of the voltage across the capacitor is shown by waveform *e*.

Obviously, the output repetition rate of the circuit may not exceed the time necessary to charge the capacitor.

Upon application of a trigger pulse from the source 21, waveform *a*, the silicon controlled rectifier is enabled; placing a voltage across terminals *b–c*, the load 24 and potentiometer 19. The SCR remains enabled until completion of the capacitor discharge unless the source 10 is on the positive portion of the sinusoidal signal. When the source 10 swings to the negative portion of the sinusoidal cycle, the current through the silicon controlled rectifier 15 is reduced to zero, which automatically turns it off until another trigger pulse is received.

The capacitor charging current is given by conventional mathematical equations concerning capacitive charging from a sinusoidal half-wave source of voltage.

The rate of discharge of the capacitor is a function of the equivalent impedance of the circuit and the load and obviously will vary with each load.

Thus, a trigger pulse circuit has been fully disclosed which is of high reliability, set by an A.C. varying power source and which utilizes a single silicon control rectifier to produce a trigger pulse of high current.

Obviously many modifications and variations of the present invention are possible in the light of the above teachings. It is therefore to be understood that within the scope of the appended claim the invention may be practices otherwise than as specifically described.

What is claimed is:

1. A trigger pulse network comprising a capacitor;

a charging circuit for said capacitor comprising a source of alternating current and a half-wave rectifier means connected to said capacitor so as to form a closed loop;

an inductive load;

a closed loop discharge circuit for said capacitor including said capacitor, said inductive load, a variable resistor, and a silicon controlled rectifier having an anode, a cathode and a gate;

means for applying trigger pulses to said gate of said silicon controlled rectifier including a magnetic core transformer and a protective diode; and a transient suppressing means consisting of a diode connected across said load.

No references cited.

ARTHUR GAUSS, *Primary Examiner.*

B. P. DAVIS, *Assistant Examiner.*